United States Patent
Cowan et al.

(10) Patent No.: US 11,851,213 B1
(45) Date of Patent: Dec. 26, 2023

(54) METHODS AND STRUCTURAL GAP FILLER FOR ONE-UP ASSEMBLY

(71) Applicant: The Boeing Company, Chicago, IL (US)

(72) Inventors: Daniel James Cowan, North Charleston, SC (US); Shane Edward Arthur, Kirkland, WA (US); Marianne Elizabeth Wilkinson, Redmond, WA (US); Mark W. Cleary, Renton, WA (US); Bart Stevens, Summerville, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 18/046,887

(22) Filed: Oct. 14, 2022

(51) Int. Cl.
*B64F 5/10* (2017.01)
*B23B 35/00* (2006.01)

(52) U.S. Cl.
CPC .............. *B64F 5/10* (2017.01); *B23B 35/00* (2013.01)

(58) Field of Classification Search
CPC ... B64C 1/12; B64C 1/069; B64C 3/26; F16B 11/006
See application file for complete search history.

(56) References Cited

U.S. PATENT DOCUMENTS

| | | | |
|---|---|---|---|
| 4,891,732 A | 1/1990 | Jones | |
| 4,980,005 A * | 12/1990 | Scollard | B64C 1/06 156/92 |
| 5,358,397 A | 10/1994 | Ligon et al. | |
| 5,752,657 A | 5/1998 | Hogan et al. | |
| 7,785,041 B2 * | 8/2010 | Ginter | E21D 20/025 405/259.5 |
| 8,220,131 B2 | 7/2012 | Crumpler et al. | |
| 8,225,508 B2 * | 7/2012 | Houis | B23B 49/02 29/525.01 |
| 8,438,717 B2 * | 5/2013 | Gorr | B64F 5/10 425/570 |
| 8,587,916 B2 * | 11/2013 | Yamakoshi | F16B 43/001 361/218 |
| 9,038,866 B2 | 5/2015 | Nelson et al. | |
| 9,102,019 B2 | 8/2015 | Negroni | |
| 9,446,356 B2 | 9/2016 | Milner | |
| 9,925,558 B2 | 3/2018 | Belanger | |
| 10,502,235 B2 | 12/2019 | Robertson et al. | |
| 10,603,844 B2 | 3/2020 | Khosravani et al. | |

(Continued)

FOREIGN PATENT DOCUMENTS

| | | | | |
|---|---|---|---|---|
| CN | 112590084 A | | 4/2021 | |
| DE | 102005019877 B4 * | | 6/2015 | ............ B21J 15/142 |

(Continued)

OTHER PUBLICATIONS

FR-3068902-A1 machine translation (Year: 2019).*

(Continued)

*Primary Examiner* — Michael W Hotchkiss
(74) *Attorney, Agent, or Firm* — Yee & Associates, P.C.

(57) ABSTRACT

Methods and structural gap filler for one up assembly of structures. Drilling debris generated between the first component and the second component during drilling of an injection hole are encapsulated by injecting a structural gap filler through the injection hole and between the first component and the second component.

25 Claims, 12 Drawing Sheets

(56) References Cited

U.S. PATENT DOCUMENTS

| | | | |
|---|---|---|---|
| 10,675,798 B2 * | 6/2020 | Mencel, Jr. | B29C 45/14508 |
| 10,722,923 B2 | 7/2020 | Cairns | |
| 10,808,740 B2 * | 10/2020 | Mayer | B21J 15/12 |
| 10,982,705 B2 | 4/2021 | Khosravani | |
| 11,001,364 B2 | 5/2021 | Edwards et al. | |
| 11,303,047 B2 | 4/2022 | Hansen et al. | |
| 11,305,390 B2 * | 4/2022 | Oberoi | F16B 5/0642 |
| 11,370,036 B2 * | 6/2022 | Cai | F16B 5/0642 |
| 11,472,154 B2 * | 10/2022 | Wolf | F16B 11/006 |
| 2004/0099699 A1 | 5/2004 | Zubeck | |
| 2006/0179637 A1 * | 8/2006 | Schueler | B25B 5/06 29/897 |
| 2007/0152012 A1 * | 7/2007 | Day | B21J 15/142 227/15 |
| 2010/0043194 A1 * | 2/2010 | Houis | B21J 15/14 29/428 |
| 2010/0242256 A1 * | 9/2010 | Gorr | B64F 5/10 425/570 |
| 2010/0308171 A1 * | 12/2010 | Kelley | B23P 19/04 29/525.01 |
| 2012/0236457 A1 * | 9/2012 | Yamakoshi | B64D 45/02 29/525.01 |
| 2013/0152397 A1 * | 6/2013 | Oberoi | B64C 1/18 901/30 |
| 2014/0173879 A1 * | 6/2014 | Negroni | B23B 35/00 29/525.01 |
| 2014/0224932 A1 * | 8/2014 | Cardin | B32B 3/06 244/119 |
| 2017/0284449 A1 * | 10/2017 | Greegor | F16B 35/04 |
| 2017/0361352 A1 * | 12/2017 | Mencel, Jr. | B29C 45/14508 |
| 2018/0066693 A1 * | 3/2018 | Busby | B32B 15/095 |
| 2018/0111701 A1 * | 4/2018 | Cai | B23B 35/00 |
| 2018/0169918 A1 * | 6/2018 | Simonin | B05C 21/00 |
| 2019/0283114 A1 * | 9/2019 | Chan | B21J 15/022 |
| 2020/0016855 A1 | 1/2020 | Krishnaswamy et al. | |
| 2020/0262586 A1 * | 8/2020 | Farre | B64F 5/10 |
| 2020/0398507 A1 * | 12/2020 | Mishra | B29C 73/00 |
| 2021/0387208 A1 | 12/2021 | Erickson et al. | |
| 2022/0184904 A1 | 6/2022 | Widdle | |
| 2023/0066560 A1 * | 3/2023 | Widdle | B64F 5/10 |

FOREIGN PATENT DOCUMENTS

| | | | |
|---|---|---|---|
| EP | 2550431 B1 * | 11/2016 | E21D 20/028 |
| FR | 3068902 A1 * | 1/2019 | B05C 5/0212 |
| WO | 2021202749 A1 | 10/2021 | |

OTHER PUBLICATIONS

DE-102005019877-B4 machine translation (Year: 2005).*

EP-2550431-B1 machine translation (Year: 2016).*

Office Action, dated Apr. 17, 2023, regarding U.S. Appl. No. 17/475,066, 12 pages.

Avila et al., "Strategies for Burr Minimization and Cleanability in Aerospace and Automotive Manufacturing," SAE 2005 Transactions Journal of Aerospace-V114-1, 10 pages. https://escholarship.org/content/qt9ks6b6dp/qt9ks6b6dp_noSplash_e66e9592fff1ce79fa89362517b94fc1.pdf.

Sisco, "Achieving "One Up Assembly" by Reduction of Interface Burr Height in Aluminum, Graphite, and Advanced Titanium/Graphite Hybrid (TiGr) Material," SAE Technical Paper Series, SAE Aerospace Manufacturing Technology Conference and Exhibition, 2003 Aerospace Congress and Exhibition, Montreal, Canada, Sep. 8-11, 2003, 8 pages.

* cited by examiner

METHODS AND STRUCTURAL GAP FILLER FOR ONE-UP ASSEMBLY

BACKGROUND INFORMATION

1. Field

The present disclosure relates generally to structural assembly and more specifically to filling gaps between two components.

2. Background

During manufacturing of aircraft, loose debris within an aircraft structure is undesirable. Currently airplane structures are taken apart and burrs or drilling debris are removed from gaps between components after drilling. Cleaning and repositioning the components adds significant flow time and labor to the airplane build process.

Therefore, it would be desirable to have a method and apparatus that takes into account at least some of the issues discussed above, as well as other possible issues. For example, it would be desirable to have an alternative to taking apart structures and removing loose debris between the structures.

SUMMARY

An embodiment of the present disclosure provides a method of performing one-up assembly of a structure. An injection hole is drilled through the first component and second component. Drilling debris generated between the first component and the second component during drilling of the injection hole are encapsulated by injecting a structural gap filler through the injection hole and between the first component and the second component. A hole is drilled through the injection hole and through the first component, the structural gap filler, and the second component. Clamp-up of the first component and the second component is maintained between drilling the injection hole and drilling the hole.

An embodiment of the present disclosure provides a method of performing one-up assembly of a structure. An injection hole is drilled through a first component and a second component. Drilling debris generated between the first component and the second component during drilling of the injection hole is encapsulated by injecting a structural gap filler through the injection hole and between the first component and the second component. A hole is drilled through the first component, the structural gap filler, and the second component, the hole offset from the injection hole. Clamp-up of the first component and the second component is maintained between drilling the injection hole and drilling the hole.

Yet another embodiment of the present disclosure provides a method of performing one-up assembly of a structure. An injection hole is drilled through the first component and second component. A structural gap filler is injected through the injection hole and between the first component and the second component to fill a gap between the first component and the second component. Clamp-up of the first component and the second component is maintained between drilling the injection hole and injecting the structural gap filler.

A further embodiment of the present disclosure provides a method of performing one-up assembly. A first component is positioned relative to a second component. The first component and the second component are pulled up to reduce space between the first component and the second component. An injection hole is drilled through the first component and the second component. Drilling debris generated between the first component and the second component during drilling of the injection hole are encapsulated by injecting a structural gap filler through the injection hole and between the first component and the second component. A hole is drilled through the injection hole and through the first component, the structural gap filler, and the second component. Drilling the hole through the structural gap filler reduces burr production during drilling of the hole. Clamp-up of the first component and the second component is maintained between drilling the injection hole and drilling the hole.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that currently it is desirable for two drilled surfaces in aircraft manufacturing to be pulled together less than 0.008". The illustrative examples recognize and take into account that it is desirable to reduce the manufacturing time of components. The illustrative examples recognize and take into account that reducing manufacturing steps can also reduce manufacturing cost.

The illustrative examples recognize and take into account that composite materials include reinforcing fibers bound in resin matrix. The fibers can be unidirectional or can take the form of a woven cloth or fabric. The fibers and resins are arranged and cured or consolidated to form a composite material. The illustrative examples recognize and take into account that composite materials are not as flexible as metals without fracture.

Figure 1:
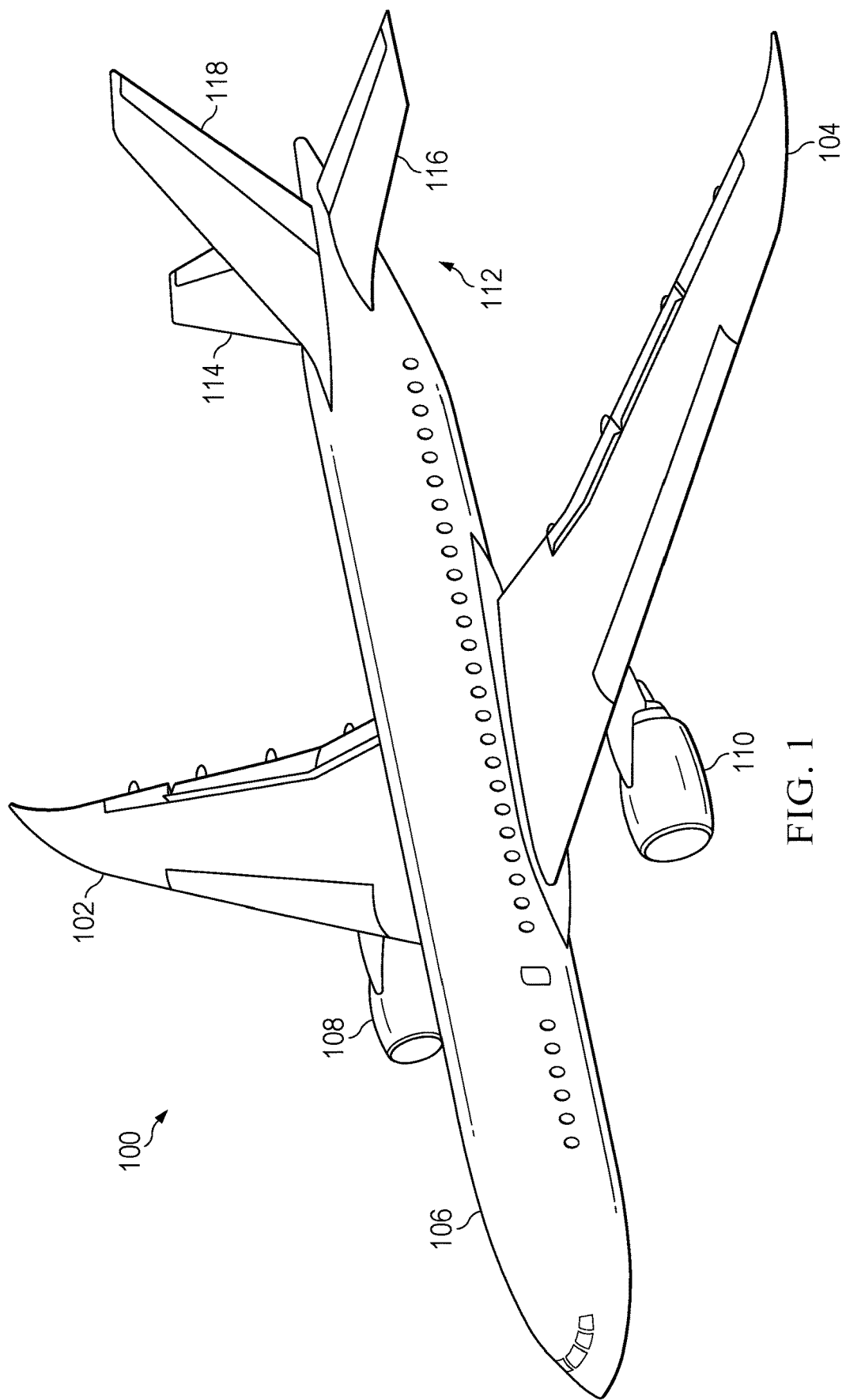
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having large composite components that can be manufactured using structural gap filler and methods of use. For example, portions of body 106, wing 102, or wing 104 can be manufactured using the illustrative examples of a structural gap filler and methods of one-up assembly.

Figure 2:
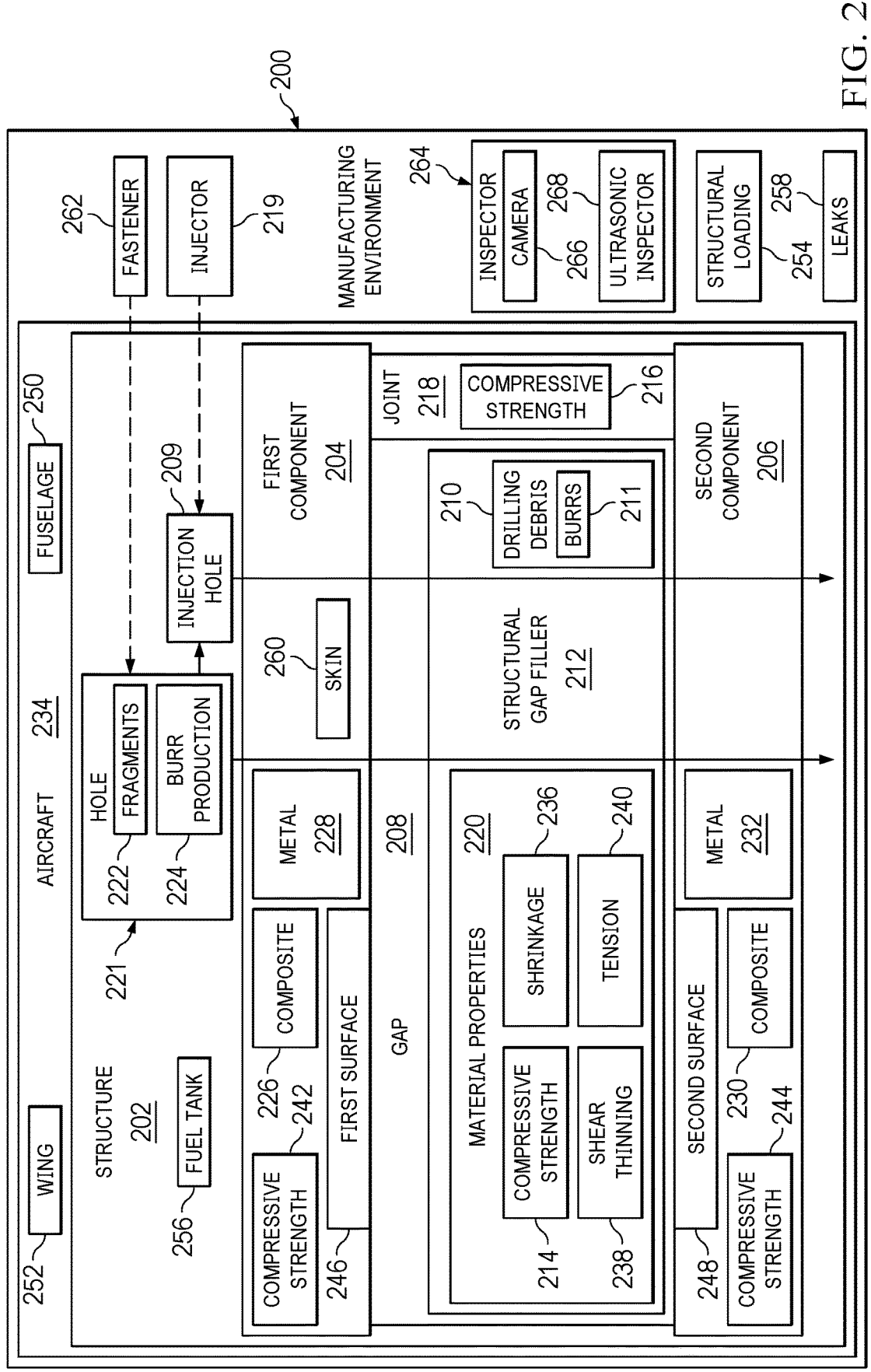
FIG. 2 is an illustration of a block diagram of a manufacturing environment in accordance with an illustrative embodiment.

Turning now to FIG. 2, an illustration of a block diagram of a manufacturing environment is depicted in which an illustrative embodiment may be implemented. Manufacturing environment 200 is a manufacturing environment in which structure 202 can be assembled using one-up assembly.

Structure 202 comprises first component 204, second component 206. When pulled up, gap 208 is present between first component 204 and second component 206. Drilling through first component 204, gap 208, and second component 206 generates drilling debris.

Injection hole 209 is drilled through first component 204, gap 208, and second component 206 generating drilling debris 210 within gap 208. Drilling debris 210 includes at least one of loose foreign object debris or burrs 211.

Structural gap filler 212 is injected through injection hole 209 to fill gap 208. As depicted, structural gap filler 212 encapsulates drilling debris 210 between first component 204 and second component 206. Structural gap filler 212 has compressive strength 214 equivalent to or greater than compressive strength 216 of joint 218 between first component 204 and second component 206.

Structural gap filler 212 can include at least one of a curable structural gap filler material, a hardening structural gap filler material, a resin, an epoxy, an epoxy resin, a two-part resin, an adhesive, an adhesive resin, a polymer, a polymeric material, or a curable composite material. Structural gap filler 212 is configured to be in a liquid or flowable state when structural gap filler 212 is within injector 219 and injected into gap 208. Structural gap filler 212 is configured to cure, harden, solidify, and/or set into a structural material after being injected by injector 219. Injector 219 is configured to inject any suitable type of structural gap filler 212. In some illustrative examples, structural gap filler 212 may be referred to as a liquid shim material, or as a structural liquid shim material.

Structural gap filler 212 has material properties 220 selected to encapsulate drilling debris 210. Structural gap filler 212 has material properties 220 selected to form joint 218. In some illustrative examples, structural gap filler 212 has compressive strength 214 of at least 30 ksi. In some illustrative examples, structural gap filler 212 has a compressive strength 214 of at least 60 ksi.

By encapsulating drilling debris 210, manufacturing steps are reduced for structure 202. By encapsulating drilling debris 210, drilling debris 210 remain within structure 202. By encapsulating drilling debris 210, first component 204 and second component 206 are not separated to remove drilling debris 210. By encapsulating drilling debris 210, clamp-up of first component 204 and second component 206 is maintained through later processing steps. Encapsulating drilling debris 210 eliminates cleaning steps that take apart first component 204 and second component 206. Encapsulating drilling debris 210 saves manufacturing time and reduces manufacturing costs.

Structure 202 also comprises hole 221 drilled through first component 204, structural gap filler 212, and second component 206. Although hole 221 is depicted as separate from injection hole 209, in some illustrative examples, hole 221 is drilled through injection hole 209. In these illustrative examples, hole 221 has a greater diameter than injection hole 209 and injection hole 209 is drilled out by drilling hole 221. In some illustrative examples, hole 221 and injection hole 209 are concentric.

In some illustrative examples, drilling hole 221 removes at least a portion of the structural gap filler 212 and at least a portion of drilling debris 210 encapsulated by structural gap filler 212. When drilling debris 210 are encapsulated by structural gap filler 212, drilling debris 210 can be referred to as encapsulated drilling debris. In some illustrative examples, drilling hole removes burrs 211 of at least one of first component 204 or second component 206 formed by drilling injection hole 209.

In some illustrative examples, drilling hole 221 comprises drilling hole 221 offset from injection hole 209. In some of these illustrative examples, drilling hole 221 removes structural gap filler 212 and drilling debris 210. In some illustrative examples, when hole 221 is drilled offset from injection hole 209, hole 221 is drilled offset from a center of injection hole 209. In some illustrative examples, when hole 221 is drilled offset from injection hole 209, hole 221 is drilled such that hole 221 is not concentric with injection hole 209. In some illustrative examples, when hole 221 is drilled offset from injection hole 209, a portion of injection hole 209 is encompassed by hole 221. In some illustrative examples, when hole 221 is drilled offset from injection hole 209, injection hole 209 remains in first component 204 and second component 206.

In some illustrative examples, structural gap filler 212 propels fragments 222 of first component 204 away from structural gap filler 212 during drilling of hole 221. In some illustrative examples, structural gap filler 212 reduces burr production 224 during drilling of hole 221. In some illustrative examples, structural gap filler 212 reduces burr production 224 by filling gap 208.

In some illustrative examples, first component 204 is formed of at least one of composite 226 or metal 228. In some illustrative examples, second component 206 is formed of at least one of composite 230 or metal 232. In some illustrative examples, at least one of first component 204 or second component 206 is formed of a composite material, composite 226 or composite 230.

In some illustrative examples, at least one of first component 204 or second component 206 comprises metal, metal 228 or metal 232. In some illustrative examples, first component 204 and second component 206 are parts of aircraft 234. In these illustrative examples, first component 204 and second component 206 are aircraft components.

Structural gap filler 212 is selected to be compatible with the material of first component 204 and second component 206. Structural gap filler 212 is selected such that structural gap filler 212 does not undesirably chemically react with the material of first component 204 and second component 206.

Structural gap filler 212 has material properties 220 configured to allow for injection by injector 219. Structural gap filler 212 has material properties 220 configured to encapsulate drilling debris 210. In some illustrative examples, material properties 220 include shrinkage 236 configured to continue to fill gap 208 after curing structural gap filler 212. In some illustrative examples, material properties 220 include shear thinning 238 configured to encapsulate drilling debris 210. Shear thinning 238 is configured to enable structural gap filler 212 to flow into gap 208 when energy, such as pressure from injection, is applied to structural gap filler 212. Once injection pressure is removed from structural gap filler 212, shear thinning 238 of structural gap filler 212 maintains structural gap filler 212 within gap 208. In some illustrative examples, shear thinning 238 of structural gap filler 212 substantially stops movement of structural gap filler 212 such that structural gap filler 212 does not flow outside of gap 208.

Material properties 220 of structural gap filler 212 are configured to provide encapsulation of drilling debris 210. In some illustrative examples, the viscosity measurement range at room temperature (75 F) can be from 300K Poise at 1 rad/s to 6K Poise at 100 rad/s. Thixotropic Index is a test for shear thinning materials. The Thixotropic Index measures the material viscosity at a slow rotation speed and divides the result by the viscosity at a higher rotation speed that is typically a factor of 10 higher from the slower speed rotation. For Thixotropic Indexes, higher numbers indicate a greater amount of shear thinning. In some illustrative examples, structural gap filler 212 can have Thixotropic Indexes of approximately 4 to approximately 8.

In some illustrative examples, structural gap filler 212 has compressive strength 214 equal to or greater than at least one of compressive strength 242 of first component 204 or compressive strength 244 of second component 206. Gap 208 is present between first surface 246 of first component 204 and second surface 248 and second component 206. In some illustrative examples, first component 204 and second component 206 are components of fuselage 250 of aircraft 234. In some illustrative examples, first component 204 and second component 206 are components of wing 252. Structural gap filler 212 is configured to meet structural loading 254 of joint 218 dependent on location and functioning of joint 218. Material properties 220 of structural gap filler 212 within wing 252 could be different than material properties of structural gap filler 212 within fuselage 250 due to different structural loading 254 of wing 252 and fuselage 250. In some illustrative examples, joint 218 is in fuel tank 256 within wing 252. In some illustrative examples, when joint 218 is in fuel tank 256, structural gap filler 212 is configured to reduce or prevent leaks 258 from fuel tank 256. In these illustrative examples, material properties 220 of structural gap filler 212 are also selected to reduce or prevent leaks.

In some illustrative examples, first component 204 comprises skin 260. When first component 204 comprises skin 260, gap 208 is part of inaccessible portions of structure 202. In some illustrative examples, skin 260 is part of one of fuselage 250 or wing 252.

In some illustrative examples, injection hole 209 is a pilot hole. In some illustrative examples, hole 221 is configured to receive fastener 262 to join first component 204 and second component 206.

In some illustrative examples, gap 208 is identified using inspector 264. In some illustrative examples, inspector 264 comprises camera 266. Camera 266 can be inserted into injection hole 209 to detect gap 208. In some illustrative examples, inspector 264 comprises ultrasonic inspector 268. In some illustrative examples, gap 208 is detected using ultrasonic inspector 268.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although only one injection hole 209 is depicted, any desirable quantity of injection holes can be drilled into first component 204 and second component 206. In some illustrative examples, multiple injection holes can be drilled through first component 204, gap 208, and second component 206. In some of these illustrative examples, structural gap filler 212 is injected through multiple injection holes into gap 208.

Figure 3:
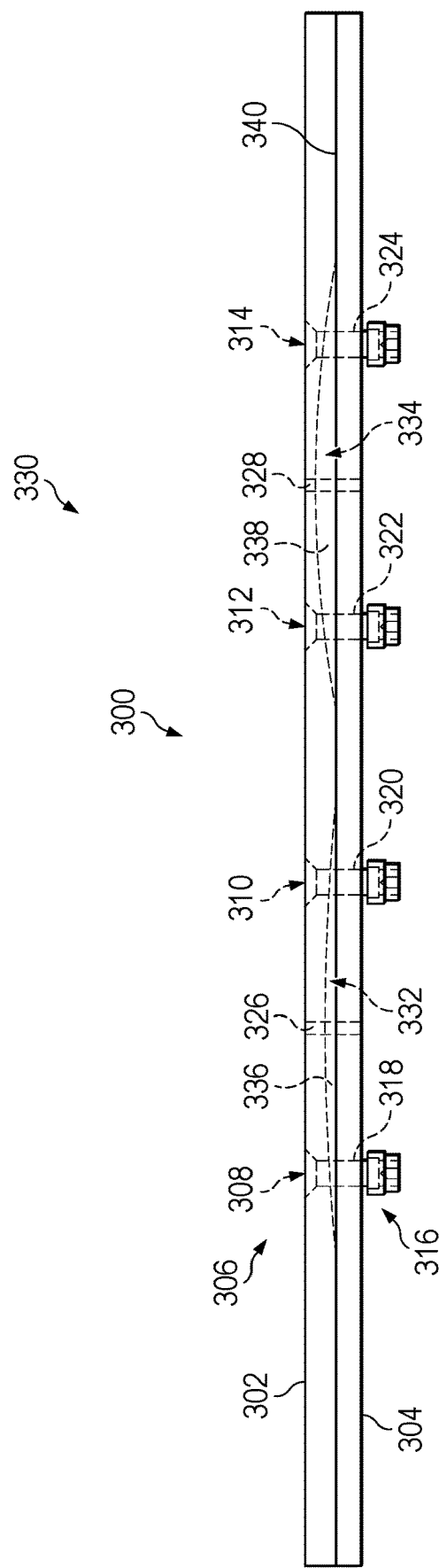
FIG. 3 is an illustration of a cross-sectional view of a structure with structural gap filler in accordance with an illustrative embodiment.

Turning now to FIG. 3 is an illustration of a cross-sectional view of a structure with structural gap filler is depicted in accordance with an illustrative embodiment. Structure 300 is a physical implementation of structure 202 of FIG. 2. Structure 300 comprises first component 302 and second component 304 joined together by fasteners 306. First component 302 is a physical implementation of first component 204 of FIG. 2. Second component 304 is a physical implementation of second component 206 of FIG. 2. As depicted, fasteners 306 comprise fastener 308, fastener 310, fastener 312, and fastener 314. Fasteners 306 extend through holes 316 including hole 318, hole 320, hole 322, and hole 324.

Injection hole 326 and injection hole 328 were drilled through first component 302 and second component 304. Prior to drilling injection hole 326 and injection hole 328, first component 302 and second component 304 were pulled up for performing manufacturing processes. As can be seen in view 330, after clamping up first component 302 and second component 304, gap 332 and gap 334 were present between first component 302 and second component 304.

Gap 332 and gap 334 are outside of manufacturing tolerances. In some illustrative examples, gaps greater than 0.008" are outside of manufacturing tolerances. Structural gap filler 336 is present in gap 332 to bring gap 332 within tolerance. Structural gap filler 338 is present in gap 334 to bring gap 334 within tolerance.

In view 330, structural gap filler 336 in gap 332 and structural gap filler 338 in gap 334 are visible. Structural gap filler 336 encapsulates drilling debris (not visible) from drilling injection hole 326. Structural gap filler 336 is injected through injection hole 326 prior to drilling hole 318 and hole 320. Hole 318 and hole 320 are drilled through first component 302, structural gap filler 338, and second component 304.

In some illustrative examples, structural gap filler 336 reduces burr production during drilling of hole 318 and hole 320. In some illustrative examples, structural gap filler 336 propels fragments of first component 302 away from structural gap filler 336 during drilling of hole 318 and hole 320.

Structural gap filler 338 encapsulates drilling debris (not visible) from drilling injection hole 328. Structural gap filler 338 is injected through injection hole 328 prior to drilling hole 322 and hole 324. In some illustrative examples, structural gap filler 338 reduces burr production during drilling of hole 322 and hole 324. In some illustrative examples, structural gap filler 338 propels fragments of first component 302 away from structural gap filler 338 during drilling of hole 322 and hole 324.

In some illustrative examples, structural gap filler 336 and structural gap filler 338 are the same material. In some illustrative examples, structural gap filler 336 and structural gap filler 338 are different materials. Structural gap filler 336 and structural gap filler 338 are present in joint 340 between first component 302 and second component 304.

Structural gap filler 336 and structural gap filler 338 each have a compressive strength equivalent to or greater than a compressive strength of joint 340 between first component 302 and second component 304. Structural gap filler 336 and structural gap filler 338 have material properties configured to provide encapsulation of the drilling debris. For example, structural gap filler 336 and structural gap filler 338 have shear thinning and fixotropic characteristics configured to encapsulate the drilling debris (not depicted).

Figure 4:
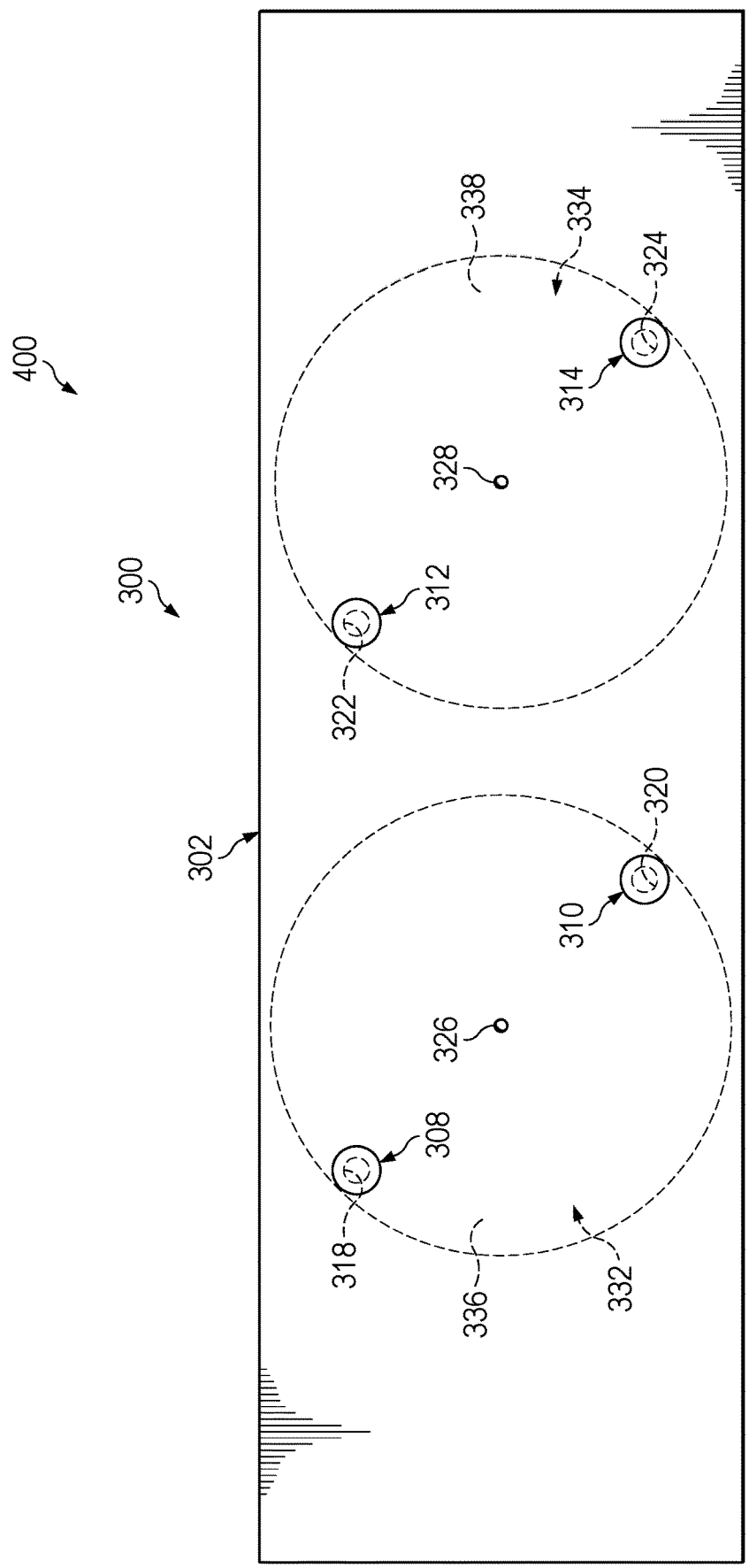
FIG. 4 is an illustration of a top view of a structure with structural gap filler in accordance with an illustrative embodiment.

Turning now to FIG. 4, an illustration of a top view of a structure with structural gap filler is depicted in accordance with an illustrative embodiment. In view 400, extents of structural gap filler 336 and structural gap filler 338 are illustrated. In view 400 hole 318 and hole 320 extend through structural gap filler 336. In view 400 hole 322 and hole 324 extend through structural gap filler 338. Structural gap filler 336 and structural gap filler 338 reduce gap 332 and gap 334 respectively to within tolerance.

In some illustrative examples, at least one of hole 318, hole 320, hole 322, or hole 324 can extend through first component 302 and second component 304 (not visible) without a structural gap filler. When a gap is not present, a hole can be drilled through first component 302 and second component 304 without a structural gap filler. When a gap between first component 302 and second component 304 is within tolerance, a hole can be drilled through first component 302 and second component 304 without a structural gap filler. Any combination of holes with and without structural gap filler can be present in structure 300.

Figure 5:
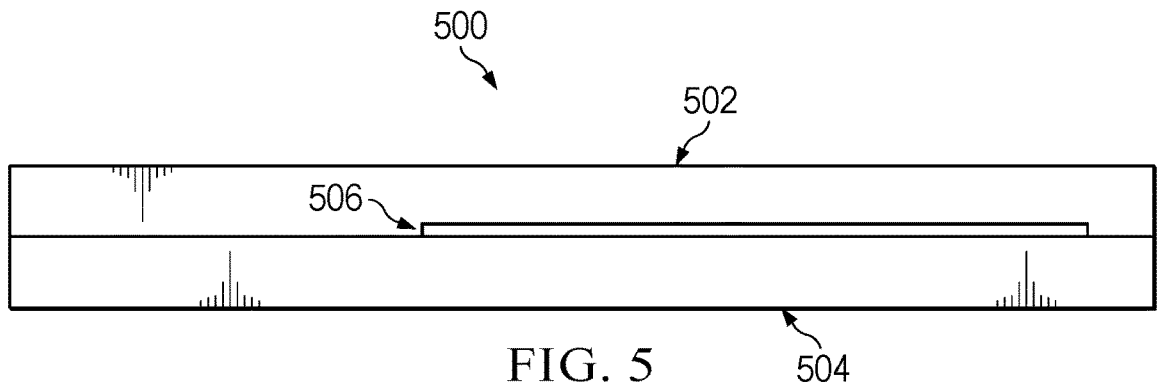
FIG. 5 is an illustration of a cross-sectional view of a structure with a gap in accordance with an illustrative embodiment.

Turning now to FIG. 5, an illustration of a cross-sectional view of a structure with a gap in accordance with an illustrative embodiment. Structure 500 is a physical implementation of structure 202 of FIG. 2. Structure 500 comprises first component 502 and second component 504 pulled up to receive drilling operations. First component 502 is a physical implementation of first component 204 of FIG. 2. Second component 504 is a physical implementation of second component 206 of FIG. 2. Gap 506 is present between first component 502 and second component 504. Gap 506 is an out of tolerance gap. Due to presence of gap 506, drilling debris will be generated between first component 502 and second component 504 during drilling.

Figure 6:
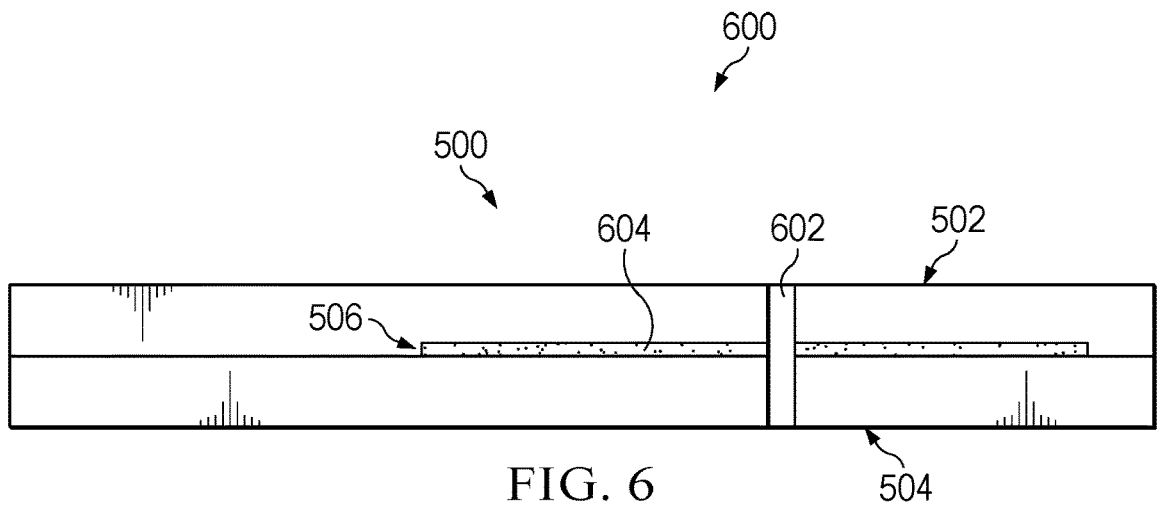
FIG. 6 is an illustration of a cross-sectional view of a structure with a gap in accordance with an illustrative embodiment.

Turning now to FIG. 6, an illustration of a cross-sectional view of a structure with a gap is depicted in accordance with an illustrative embodiment. In view 600 injection hole 602 has been drilled through first component 502 and second component 504. In drilling injection hole 602, drilling debris 604 were generated within gap 506. Drilling debris 604 includes at least one of loose foreign object debris or burrs.

Figure 7:
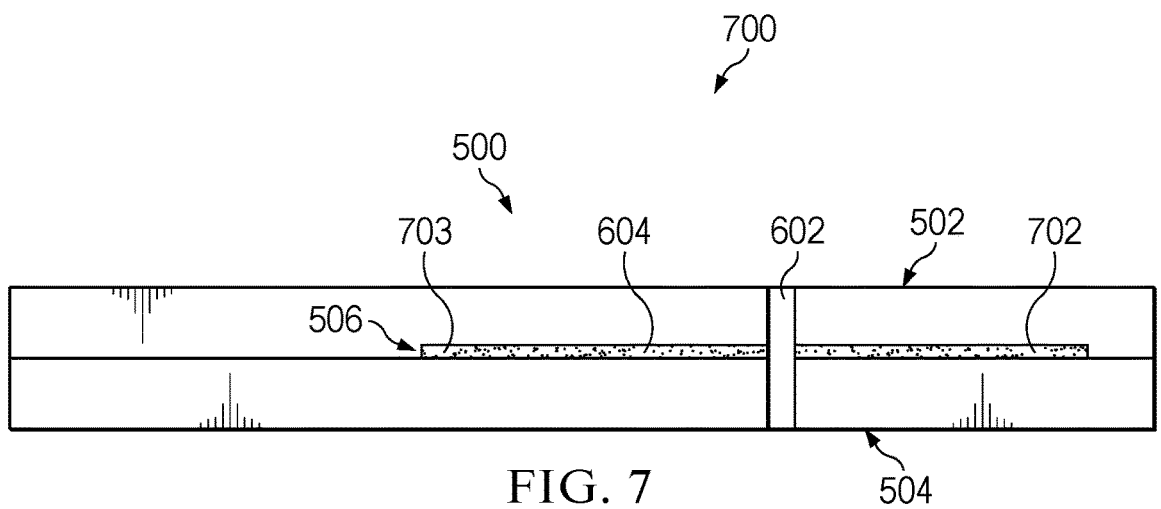
FIG. 7 is an illustration of a cross-sectional view of a structure with a filled gap in accordance with an illustrative embodiment.

Turning now to FIG. 7, an illustration of a cross-sectional view of a structure with a filled gap is depicted in accordance with an illustrative embodiment. In view 700 structural gap filler 702 has been injected into injection hole 602. Structural gap filler 702 fills gap 506. Structural gap filler 702 encapsulates drilling debris 604 between first component 502 and second component 504. Drilling debris 604 encapsulated by structural gap filler 702 can be referred to as encapsulated drilling debris 703. By encapsulating drilling debris 604, structural gap filler 702 can reduce the number of cleaning or debris removal steps. By encapsulating drilling debris 604 in structural gap filler 702, drilling debris 604 do not undesirably affect first component 502 or second component 504. Use of structural gap filler 702 to encapsulate drilling debris 604 can reduce at least one of manufacturing time or manufacturing cost. By encapsulating drilling debris 604, clamp-up of first component 502 and the second component 504 is maintained between drilling injection hole 602 and subsequent steps. In some illustrative examples, by encapsulating drilling debris 604, taking apart first component 502 and second component 504 and cleaning out burrs or drilling debris is eliminated.

Figure 8:
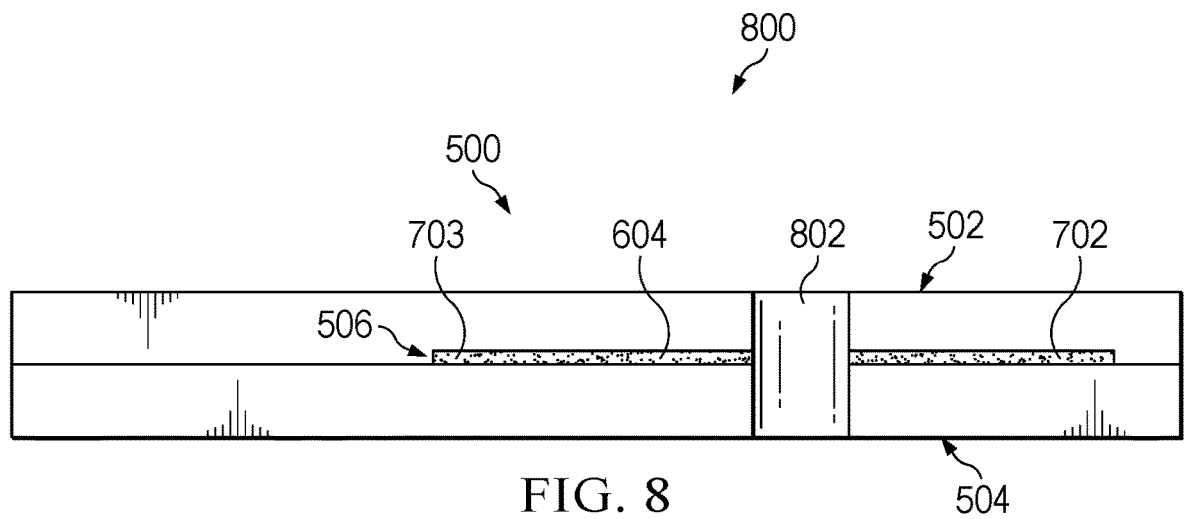
FIG. 8 is an illustration of a cross-sectional view of a structure with a filled gap in accordance with an illustrative embodiment.

Turning now to FIG. 8, an illustration of a cross-sectional view of a structure with a filled gap is depicted in accordance with an illustrative embodiment. In view 800 hole 802 has been drilled through first component 502, structural gap filler 702, and second component 504. In this illustrative example, hole 802 has been drilled through injection hole 602 of FIGS. 6 and 7.

In some illustrative examples, structural gap filler 702 reduces burr production during drilling of hole 802. In some illustrative examples, structural gap filler 702 propels fragments of first component 502 away from structural gap filler 702 during drilling of hole 802.

In some illustrative examples, drilling hole 802 removes at least a portion of structural gap filler 702 and at least a portion of encapsulated drilling debris 703. In some illustrative examples, drilling hole 802 removes burrs on at least one of first component 502 or second component 504 from drilling hole 602.

Figure 9:
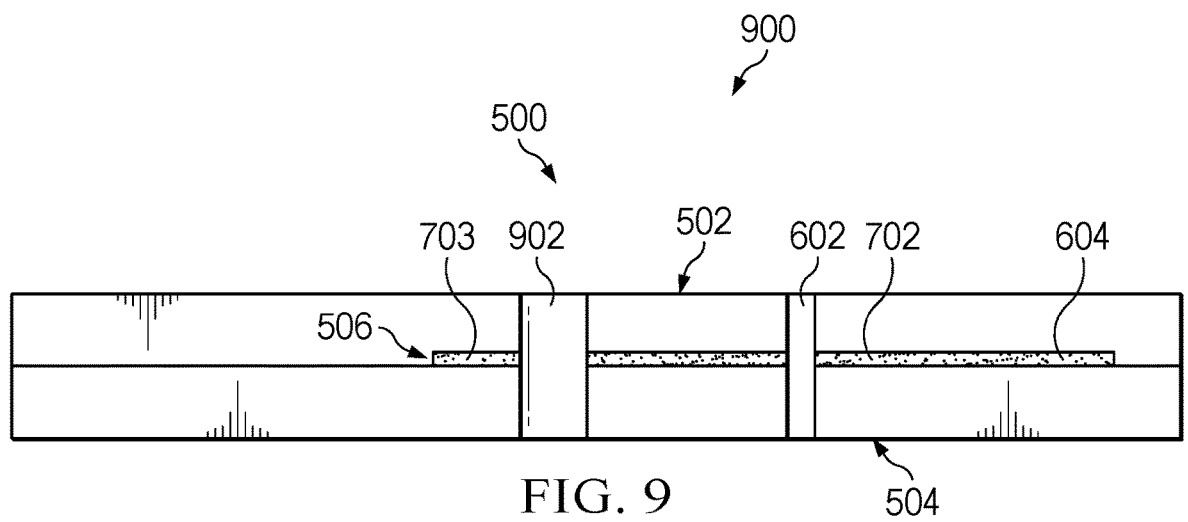
FIG. 9 is an illustration of a cross-sectional view of a structure with a filled gap in accordance with an illustrative embodiment.

Turning now to FIG. 9, an illustration of a cross-sectional view of a structure with a filled gap is depicted in accordance with an illustrative embodiment. In view 900 hole 902 has been drilled through first component 502, structural gap filler 702, and second component 504. In this illustrative example, hole 902 has been drilled offset from injection hole 602. Hole 902 and hole 802 of FIG. 8 are two implementations for placement of hole 221 of FIG. 2.

In some illustrative examples, structural gap filler 702 reduces burr production during drilling of hole 902. In some illustrative examples, structural gap filler 702 propels fragments of first component 502 away from structural gap filler 702 during drilling of hole 902. In some illustrative examples, drilling hole 802 removes at least a portion of structural gap filler 702 and at least a portion of encapsulated drilling debris 703.

Figure 10:
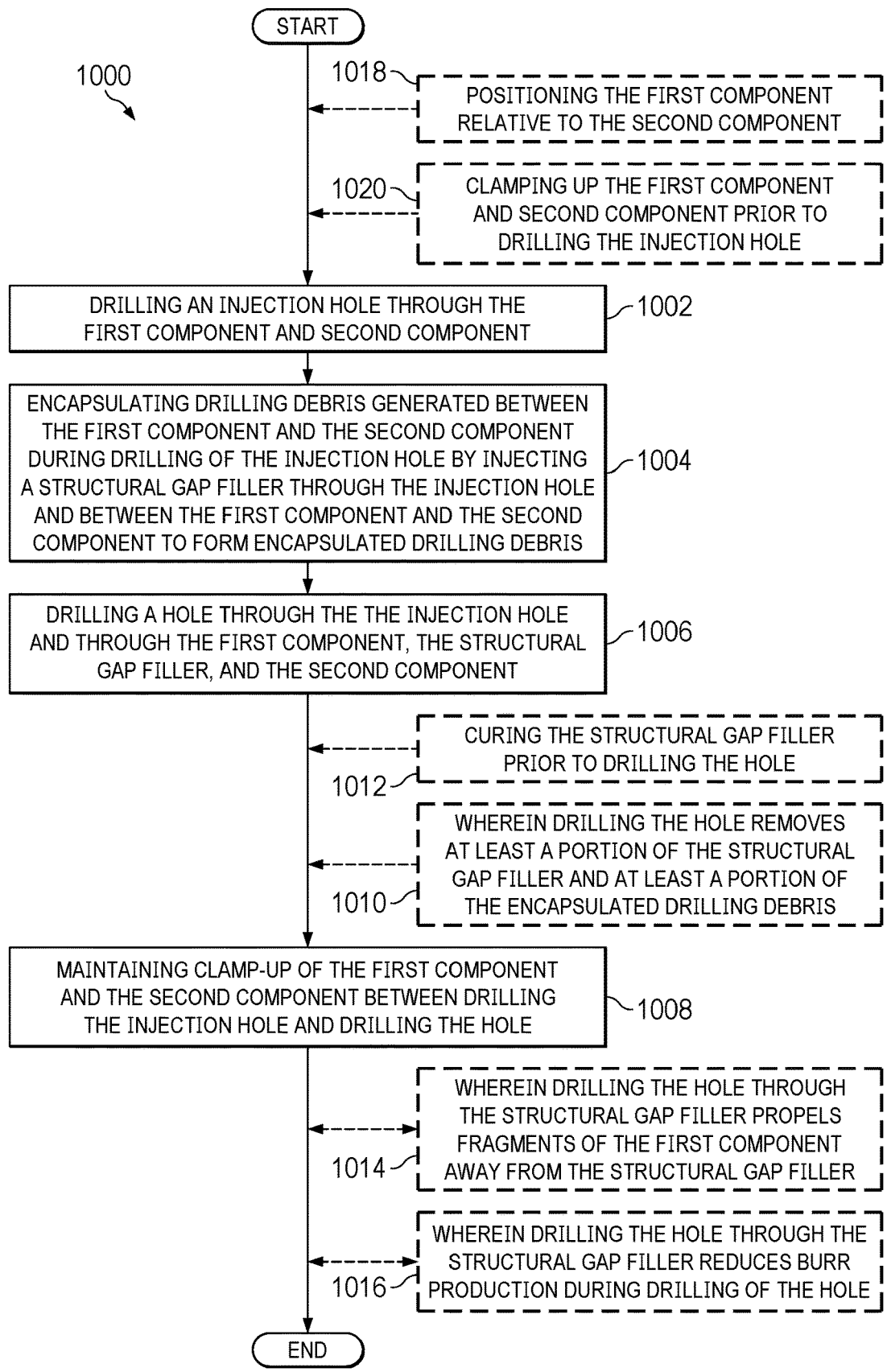
FIG. 10 is a flowchart of a method of performing one-up assembly of a structure in accordance with an illustrative embodiment.

Turning now to FIG. 10, a flowchart of a method of performing one-up assembly of a structure is depicted in accordance with an illustrative embodiment. Method 1000 can be performed to form a structure of aircraft 100 of FIG. 1. Method 1000 can be performed to form structure 202 of FIG. 2. Method 1000 can be performed to form structure 300 of FIGS. 3-4. Method 1000 can be performed in forming structure 500 of FIGS. 5-9.

Method 1000 drills an injection hole through the first component and second component (operation 1002). Method 1000 encapsulates drilling debris generated between the first component and the second component during drilling of the injection hole by injecting a structural gap filler through the injection hole and between the first component and the second component to form encapsulated drilling debris (operation 1004). Method 1000 drills a hole through the injection hole and through the first component, the structural gap filler, and the second component (operation 1006). In some illustrative examples, the hole is drilled concentric through the injection hole. In some other illustrative examples, the hole is drilled through the injection hole but not concentric with the injection hole. When the hole is drilled through the injection hole, the hole occupies the space previously including the injection hole. When the hole is drilled through the injection hole, the hole encompasses the injection hole. Method 1000 maintains clamp-up of the first component and the second component between drilling the injection hole and drilling the hole (operation 1008). Afterwards, method 1000 terminates.

In some illustrative examples, drilling the hole removes at least a portion of the structural gap filler and at least a portion of the encapsulated drilling debris (operation 1010). In some illustrative examples, the at least a portion of the encapsulated drilling debris includes burrs.

In some illustrative examples, method 1000 cures the structural gap filler prior to drilling the hole (operation 1012). The structural gap filler can be cured through any desirable method. In some illustrative examples, the structural gap filler is heat cured. In some illustrative examples, the structural gap filler is cured by applying heat to the structural gap filler. In some illustrative examples, the structural gap filler is cured by leaving the structural gap filler at ambient temperature for a set period of time.

In some illustrative examples, drilling the hole through the structural gap filler propels fragments of the first component away from the structural gap filler (operation 1014). In some illustrative examples, drilling the hole through the structural gap filler reduces burr production during drilling of the hole (operation 1016).

In some illustrative examples, method 1000 positions the first component relative to the second component (operation 1018) and clamps up the first component and second component prior to drilling the injection hole (operation 1020).

Figure 11:
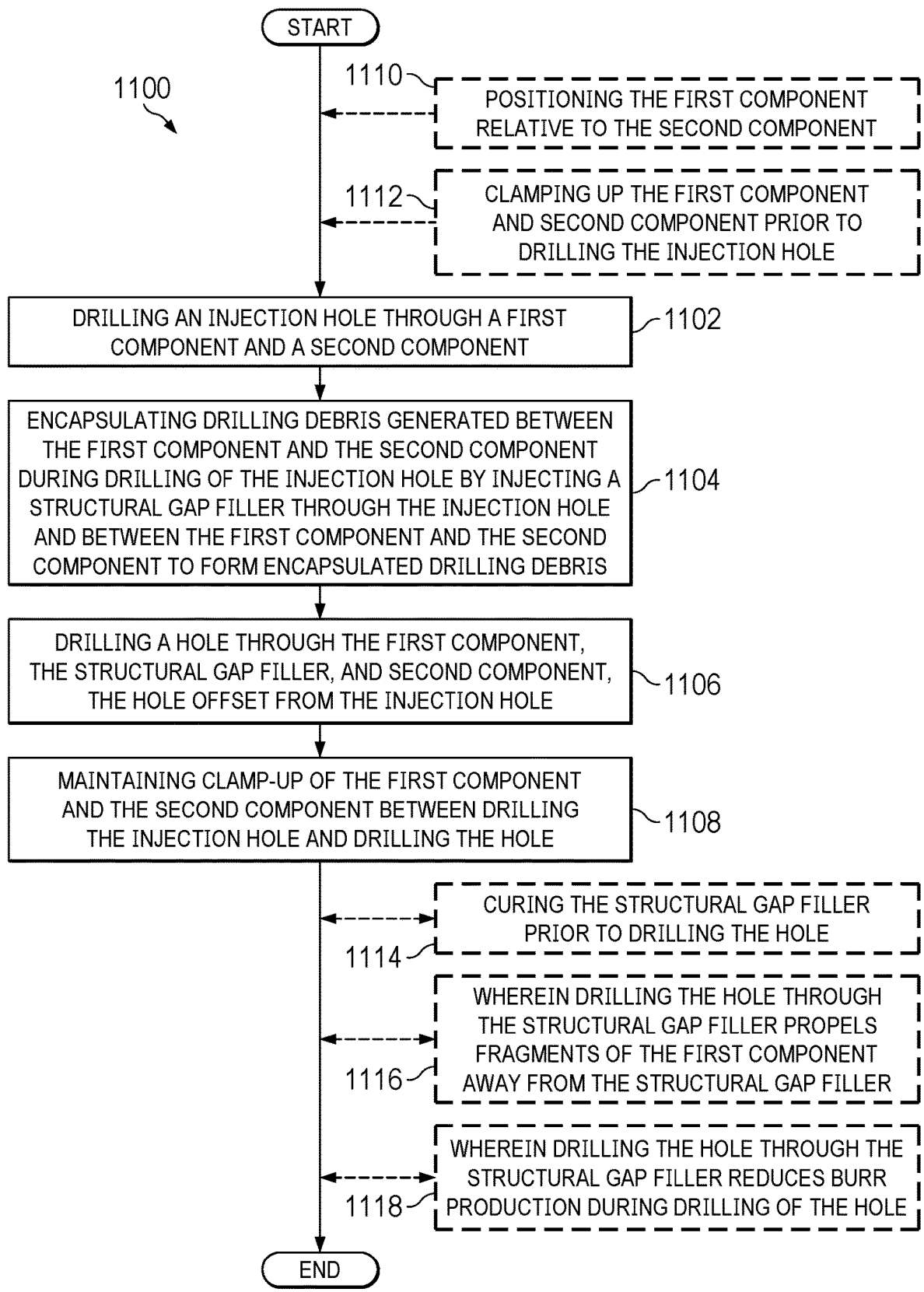
FIG. 11 is a flowchart of a method of performing one-up assembly of a structure in accordance with an illustrative embodiment.

Turning now to FIG. 11, a flowchart of a method of performing one-up assembly of a structure is depicted in accordance with an illustrative embodiment. Method 1100 can be performed to form a structure of aircraft 100 of FIG. 1. Method 1100 can be performed to form structure 202 of FIG. 2. Method 1100 can be performed to form structure 300 of FIGS. 3-4. Method 1100 can be performed in forming structure 500 of FIGS. 5-9.

Method 1100 drills an injection hole through a first component and a second component (operation 1102). Method 1100 encapsulates drilling debris generated between the first component and the second component during drilling of the injection hole by injecting a structural gap filler through the injection hole and between the first component and the second component to form encapsulated drilling debris (operation 1104). Method 1100 drills a hole through the first component, the structural gap filler, and the second component, the hole offset from the injection hole (operation 1106). In some illustrative examples, when the hole is drilled offset from the injection hole, a portion of the injection hole is encompassed by the hole. In some illustrative examples, when the hole is drilled offset from injection hole, the injection hole remains in the first component and the second component.

Method 1100 maintains clamp-up of the first component and the second component between drilling the injection hole and drilling the hole (operation 1108). Afterwards, method 1100 terminates.

In some illustrative examples, method positions the first component relative to the second component (operation 1110) and clamping up the first component and second component prior to drilling the injection hole (operation 1112). In some illustrative examples, method 1100 cures the structural gap filler prior to drilling the hole (operation 1114).

In some illustrative examples, drilling the hole through the structural gap filler propels fragments of the first component away from the structural gap filler (operation 1116). In some illustrative examples, drilling the hole through the structural gap filler reduces burr production during drilling of the hole (operation 1118).

Figure 12A:
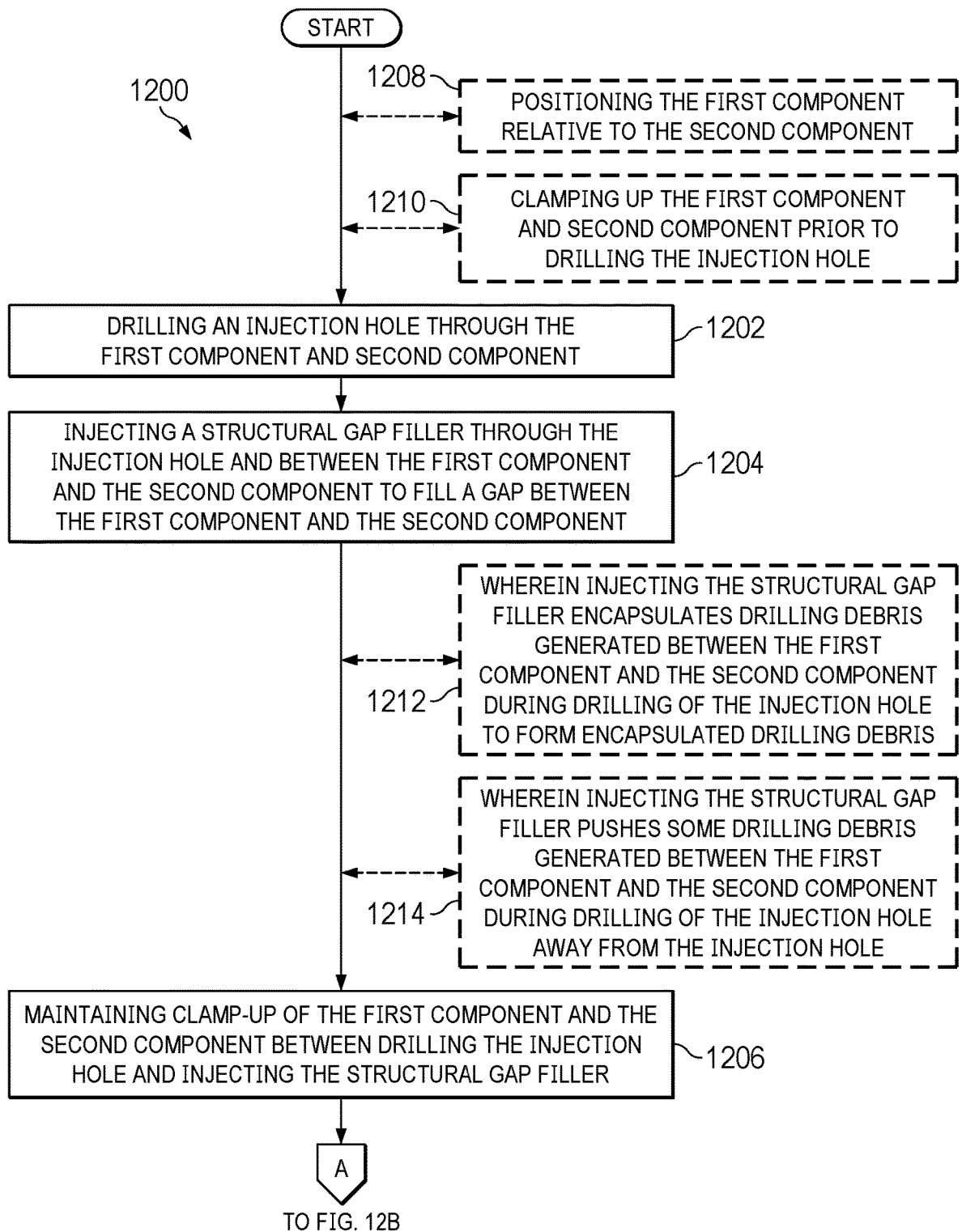
FIGS. 12A-12B are a flowchart of a method of performing one-up assembly of a structure in accordance with an illustrative embodiment.
Figure 12B:
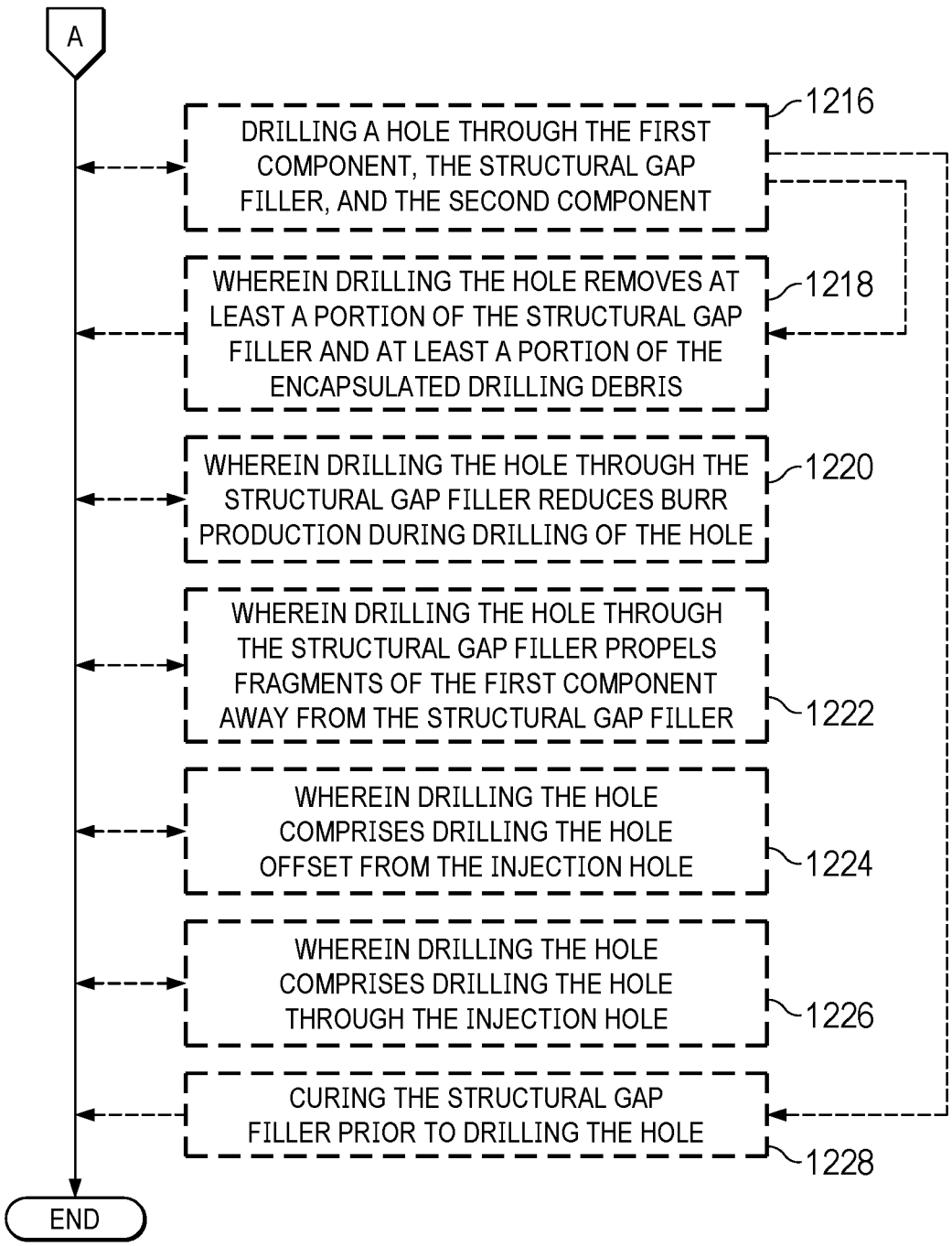

Turning now to FIGS. 12A-12B, a flowchart of a method of performing one-up assembly of a structure is depicted in accordance with an illustrative embodiment. Method 1200 can be performed to form a structure of aircraft 100 of FIG. 1. Method 1200 can be performed to form structure 202 of FIG. 2. Method 1200 can be performed to form structure 300 of FIGS. 3-4. Method 1200 can be performed in forming structure 500 of FIGS. 5-9.

Method 1200 drills an injection hole through the first component and second component (operation 1202). Method 1200 injects a structural gap filler through the injection hole and between the first component and the second component to fill a gap between the first component and the second component (operation 1204). Method 1200 maintains clamp-up of the first component and the second component between drilling the injection hole and injecting the structural gap filler (operation 1206). Afterwards, method 1200 terminates.

In some illustrative examples, method 1200 further comprises positioning the first component relative to the second component (operation 1208). In some illustrative examples, method 1200 clamps up the first component and the second component prior to drilling the injection hole (operation 1210).

In some illustrative examples, injecting the structural gap filler encapsulates drilling debris generated between the first component and the second component during drilling of the injection hole to form encapsulated drilling debris (operation 1212). In some illustrative examples, injecting the structural gap filler pushes some drilling debris generated between the first component and the second component during drilling of the injection hole away from the injection hole (operation 1214).

In some illustrative examples, method 1200 drills a hole through the first component, the structural gap filler, and the second component (operation 1216).

In some illustrative examples, drilling the hole removes at least a portion of the structural gap filler and at least a portion of the encapsulated drilling debris (operation 1218). In some illustrative examples, drilling the hole through the structural gap filler reduces burr production during drilling of the hole (operation 1220). In some illustrative examples, drilling the hole through the structural gap filler propels fragments of the first component away from the structural gap filler (operation 1222).

In some illustrative examples, drilling the hole comprises drilling the hole offset from the injection hole (operation 1224). In some illustrative examples, drilling the hole comprises drilling the hole through the injection hole (operation 1226). In some illustrative examples, method 1200 cures the structural gap filler prior to drilling the hole (operation 1228).

Figure 13:
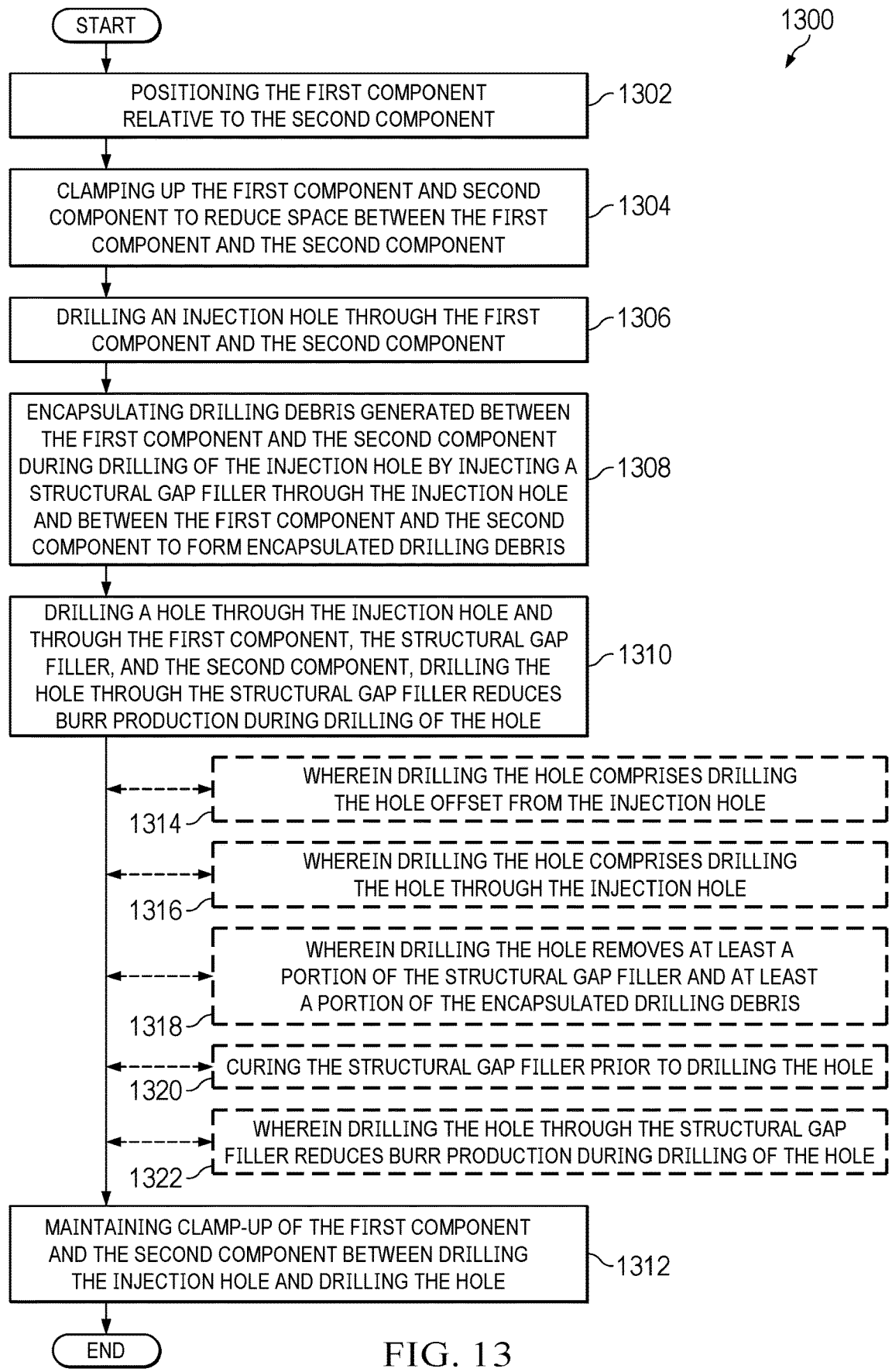
FIG. 13 is a flowchart of a method of performing one-up assembly of a structure in accordance with an illustrative embodiment.

Turning now to FIG. 13, a flowchart of a method of performing one-up assembly of a structure is depicted in accordance with an illustrative embodiment. Method 1300 can be performed to form a structure of aircraft 100 of FIG. 1. Method 1300 can be performed to form structure 202 of FIG. 2. Method 1300 can be performed to form structure 300 of FIGS. 3-4. Method 1300 can be performed in forming structure 500 of FIGS. 5-9.

Method 1300 positions the first component relative to the second component (operation 1302). Method 1300 clamps up the first component and second component to reduce space between the first component and the second component (operation 1304). Method 1300 drills an injection hole through the first component and the second component (operation 1306). Method 1300 encapsulates drilling debris generated between the first component and the second component during drilling of the injection hole by injecting a structural gap filler through the injection hole and between the first component and the second component to form encapsulated drilling debris (operation 1308). Method 1300 drills a hole through the injection hole and through the first component, the structural gap filler, and the second component, drilling the hole through the structural gap filler reduces burr production during drilling of the hole (operation 1310). Method 1300 maintains clamp-up of the first component and the second component between drilling the injection hole and drilling the hole (operation 1312). Afterwards, method 1300 terminates.

In some illustrative examples, drilling the hole comprises drilling the hole offset from the injection hole (operation 1314). In some illustrative examples, drilling the hole comprises drilling the hole through the injection hole (operation 1316).

In some illustrative examples, drilling the hole removes at least a portion of the structural gap filler and at least a portion of the encapsulated drilling debris (operation 1318). In some illustrative examples, method 1300 cures the structural gap filler prior to drilling the hole (operation 1320). In some illustrative examples, drilling the hole through the structural gap filler reduces burr production during drilling of the hole (operation 1322).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 1212 through operation 1218 may be optional.

Figure 14:
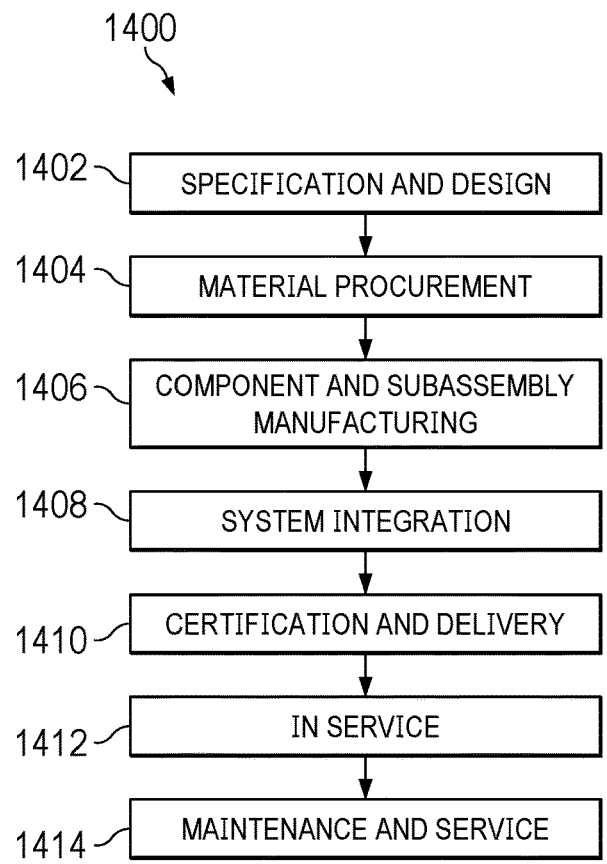
FIG. 14 is an illustration of an aircraft manufacturing and service method in a form of a block diagram in accordance with an illustrative embodiment.
Figure 15:
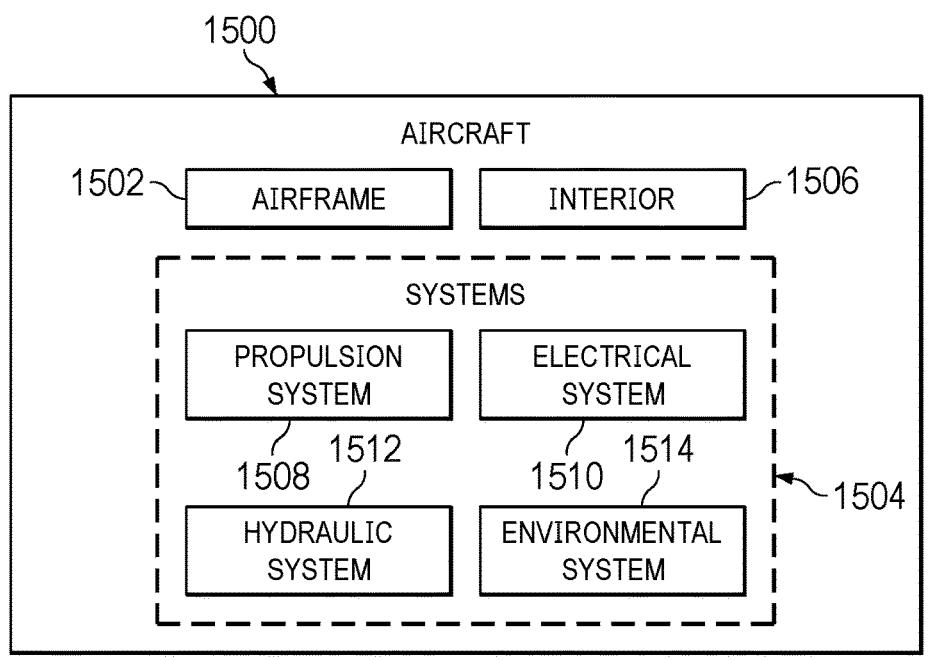
FIG. 15 is an illustration of an aircraft in a form of a block diagram in which an illustrative embodiment may be implemented.

Illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method in a form of a block diagram is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, or other maintenance and service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft in a form of a block diagram is depicted in which an illustrative embodiment may be implemented. In this example, aircraft 1500 is produced by aircraft manufacturing and service method 1400 of FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included.

Apparatuses and methods embodied herein may be employed during at least one of the stages of aircraft manufacturing and service method 1400. One or more illustrative embodiments may be manufactured or used during at least one of component and subassembly manufacturing 1406, system integration 1408, in service 1412, or maintenance and service 1414 of FIG. 14.

A portion of airframe 1502 of aircraft 1500 can be formed by one of method 1000, method 1100, method 1200, or method 1300. At least one of method 1000, method 1100, method 1200, or method 1300 can be performed during component and subassembly manufacturing 1406. A composite structure formed using one of method 1000, method 1100, method 1200, or method 1300 can be present and utilized during in service 1412. At least one of method 1000, method 1100, method 1200, or method 1300 can be performed during maintenance and service 1414 to form a replacement part.

The illustrative examples provide methods to enable one up assembly for components with gaps between the mating surfaces. The illustrative examples can reduce or eliminate the step of taking apart structures (assemblies) and removing burrs within a gap after drilling. The illustrative examples can reduce burr generation in assembly gaps. The illustrative examples can encapsulate burrs from injection hole drilling operations. The illustrative examples reduce manufacturing time by reducing or eliminating disassembly and cleaning steps.

The illustrative examples enable one up assembly by allowing for fastener insertion after drilling without taking apart structures for cleaning. The illustrative examples can enable one up assembly on airplane members with gaps larger than 0.010" where a chip or burr can result from the drilling with a gap between the skin and the substructure.

A structural gap filler material is injected into a gap present between components, such as aircraft components, through an injection hole. In some illustrative examples, the injection hole is a fastener pilot hole.

Burrs that occur during the injection hole drilling process are encapsulated in the structural gap filler material. Once the structural gap filler is cured, a fastener hole is drilled into the components. The cured structural gap filler material reduces or prevents burrs from developing during the final drilling process as there is not a gap between the components.

In some illustrative examples, a fastener hole is drilled to size over the injection hole. In these illustrative examples, final hole sizing is larger than the injection hole and thus burrs from pilot hole drilling that were encapsulated by structural gap filler can be eliminated (drilled out) when the final hole sizing is completed.

In some of the illustrative examples, drill filings encapsulated with liquid shim material injected in the drill (pilot) hole to encapsulate burrs and push drill filings away from hole edge may be removed, at least partially after drying and drilling out to full size. In some of the illustrative examples, an injection nozzle with "O" ring seals seals the nozzle to the hole walls on either side of the gap being sealed. The sealant is injected through the nozzle and past the first "O" ring seal at the gap between the proximal and distal material being fastened. The "O" ring seals can prevent sealant squeezing out of either the proximal or distal end of the fastener hole.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of assembling a structure, the method comprising:
    drilling an injection hole through a first component and a second component;
    encapsulating drilling debris generated between the first component and the second component during drilling of the injection hole by injecting a structural gap filler through the injection hole and between the first component and the second component to form encapsulated drilling debris;
    drilling a hole through the injection hole and through the first component, the structural gap filler, and the second component; and
    maintaining clamp-up of the first component and the second component between drilling the injection hole and drilling the hole.

2. The method of claim 1, wherein drilling the hole removes at least a portion of the structural gap filler and at least a portion of the encapsulated drilling debris.

3. The method of claim 1 further comprising:
    curing the structural gap filler prior to drilling the hole.

4. The method of claim 1, wherein drilling the hole through the structural gap filler reduces burr production during drilling of the hole.

5. The method of claim 1, wherein drilling the hole through the structural gap filler propels fragments of the first component away from the structural gap filler.

6. The method of claim 1 further comprising:
    positioning the first component relative to the second component; and
    clamping up the first component and second component prior to drilling the injection hole.

7. A method of assembling a structure, the method comprising:
    drilling an injection hole through a first component and a second component;
    encapsulating drilling debris generated between the first component and the second component during drilling of the injection hole by injecting a structural gap filler through the injection hole and between the first component and the second component to form encapsulated drilling debris;
    drilling a hole through the first component, the structural gap filler, and the second component, the hole offset from the injection hole; and
    maintaining clamp-up of the first component and the second component between drilling the injection hole and drilling the hole.

8. The method of claim 7 further comprising:
    curing the structural gap filler prior to drilling the hole.

9. The method of claim 7, wherein drilling the hole through the structural gap filler reduces burr production during drilling of the hole.

10. The method of claim 7, wherein drilling the hole through the structural gap filler propels fragments of the first component away from the structural gap filler.

11. The method of claim 7 further comprising:
    positioning the first component relative to the second component; and
    clamping up the first component and second component prior to drilling the injection hole.

12. A method of assembling a structure, the method comprising: drilling an injection hole through a first component and a second component; injecting a structural gap filler through the injection hole and between the first component and the second component to fill a gap between the first component and the second component; maintaining clamp-up of the first component and the second component between drilling the injection hole and injecting the structural gap filler; and wherein injecting the structural gap filler encapsulates drilling debris generated between the first component and the second component during drilling of the injection hole to form encapsulated drilling debris.

13. The method of claim 12 further comprising:
positioning the first component relative to the second component; and
clamping up the first component and second component prior to drilling the injection hole.

14. The method of claim 12, wherein injecting the structural gap filler pushes some drilling debris generated between the first component and the second component during drilling of the injection hole away from the injection hole.

15. The method of claim 12 further comprises: drilling a hole through the first component, the structural gap filler, and the second component.

16. The method of claim 15, wherein drilling the hole removes at least a portion of the structural gap filler and at least a portion of the encapsulated drilling debris.

17. The method of claim 15 further comprising:
curing the structural gap filler prior to drilling the hole.

18. The method of claim 15, wherein drilling the hole through the structural gap filler reduces burr production during drilling of the hole.

19. The method of claim 15, wherein drilling the hole through the structural gap filler propels fragments of the first component away from the structural gap filler.

20. A method of assembling a structure, the method comprising:
positioning a first component relative to a second component;
clamping up the first component and the second component to reduce space between the first component and the second component;
drilling an injection hole through the first component and the second component;
encapsulating drilling debris generated between the first component and the second component during drilling of the injection hole by injecting a structural gap filler through the injection hole and between the first component and the second component to form encapsulated drilling debris;
drilling a hole through the injection hole and through the first component, the structural gap filler, and the second component, drilling the hole through the structural gap filler reduces burr production during drilling of the hole; and
maintaining clamp-up of the first component and the second component between drilling the injection hole and drilling the hole.

21. The method of claim 20, wherein drilling the hole comprises drilling the hole through the injection hole.

22. The method of claim 20 further comprising:
curing the structural gap filler prior to drilling the hole.

23. The method of claim 20, wherein drilling the hole through the structural gap filler reduces burr production during drilling of the hole.

24. The method of claim 20, wherein drilling the hole comprises drilling the hole offset from the injection hole.

25. The method of claim 24, wherein the drilling hole removes at least a portion of the structural gap filler and at least a portion of the encapsulated drilling debris.

\* \* \* \* \*